United States Patent

[11] 3,556,545

[72] Inventor Frederick F. VanRaden
 Hillsboro, Oreg.
[21] Appl. No. 789,787
[22] Filed Jan. 8, 1969
[45] Patented Jan. 19, 1971
[73] Assignee Peerless Trailer and Truck Service, Inc.
 Tualatin, Oreg.
 a corporation of Oregon

[54] EXPANDABLE TRAILER
 3 Claims, 9 Drawing Figs.
[52] U.S. Cl..................................................... 280/34,
 280/423
[51] Int. Cl....................................................... B62d 21/14
[50] Field of Search........................................... 280/34,
 34(.1), 81, 423; 296/23(.3), 26

[56] References Cited
 UNITED STATES PATENTS
 2,318,802 5/1943 Reid............................. 280/34(.1)

3,318,611 5/1967 Branning..................... 280/34
3,339,942 9/1967 Ratkovich................... 280/34(.1)X
3,467,408 9/1969 Regalia........................ 280/423(X)

FOREIGN PATENTS
1,020,274 11/1952 France......................... 296/23(.3)

Primary Examiner—Leo Friaglia
Assistant Examiner—Leslie J. Paperner
Attorney—Buckhorn, Blore, Klarquist and Sparkman ABSTRACT: An expandable trailer for highway trucks having a first frame attachable to a driving vehicle and a second frame attached to the first frame and to which the trailer wheels are journaled. The second frame comprises two transversely disposed girders which are transversely slidable with respect to the first frame, such girders being attached to each other telescopically in the transverse direction. Piston and cylinder means are attached to the second frame and are adapted transversely to expand and contract its girders with respect to the first frame, thereby transversely to vary the width or track of the wheels.

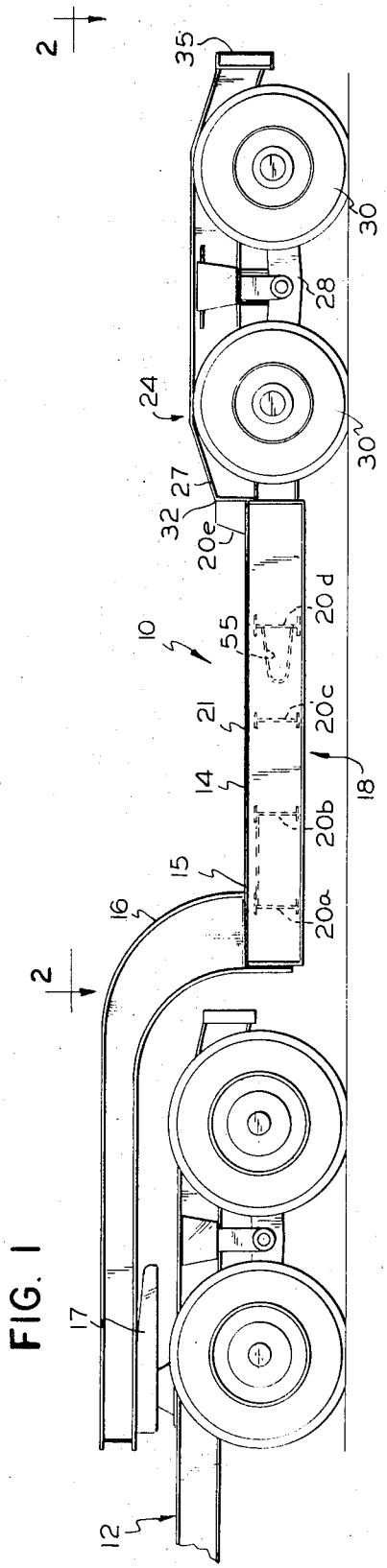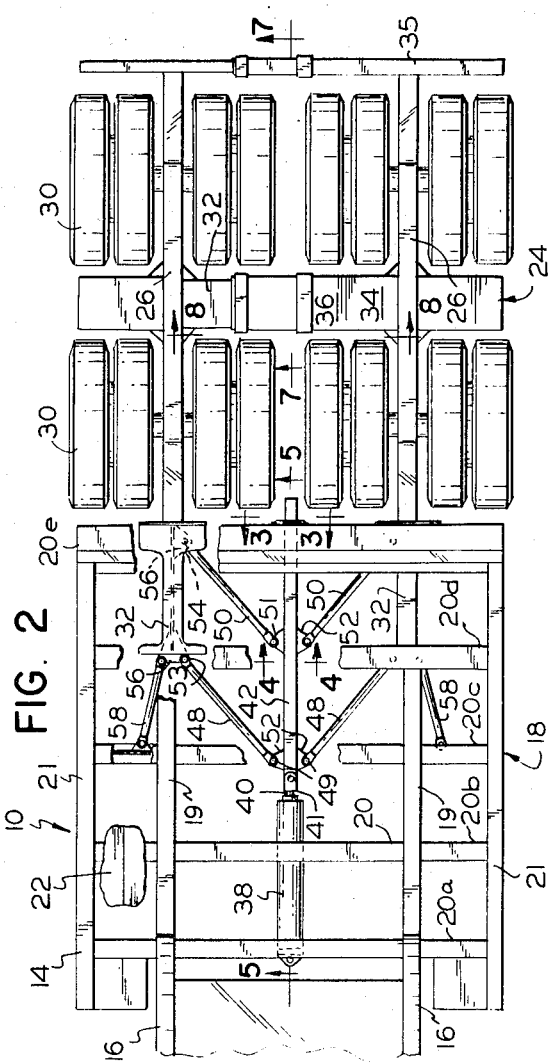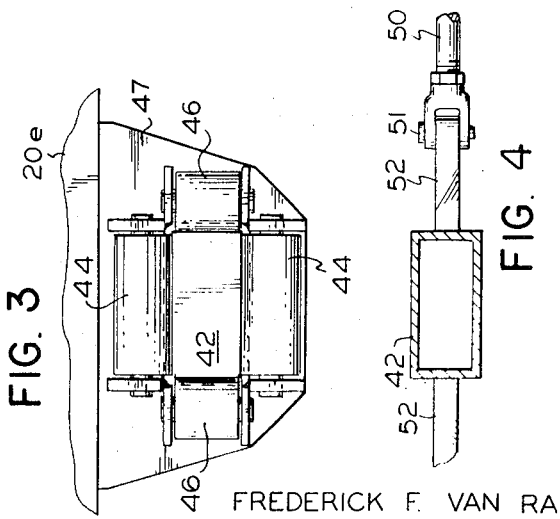

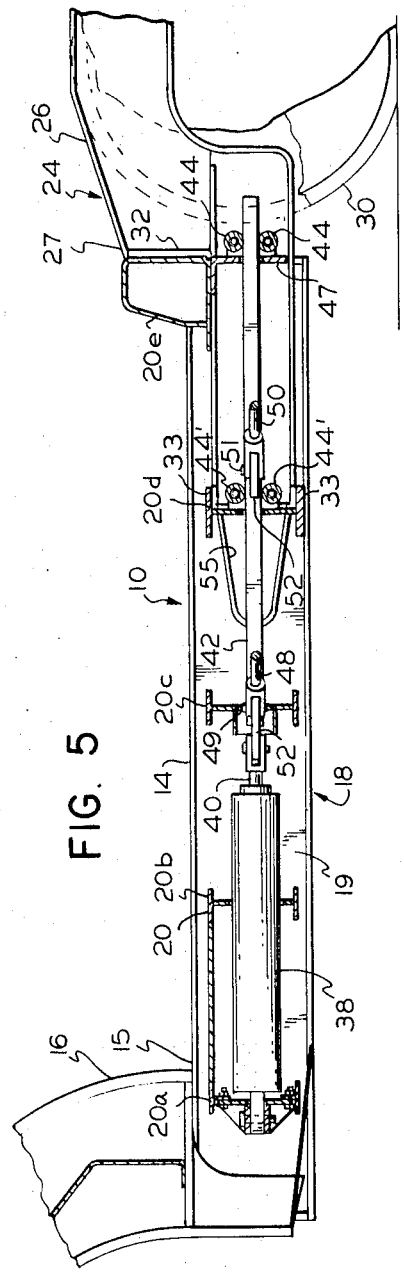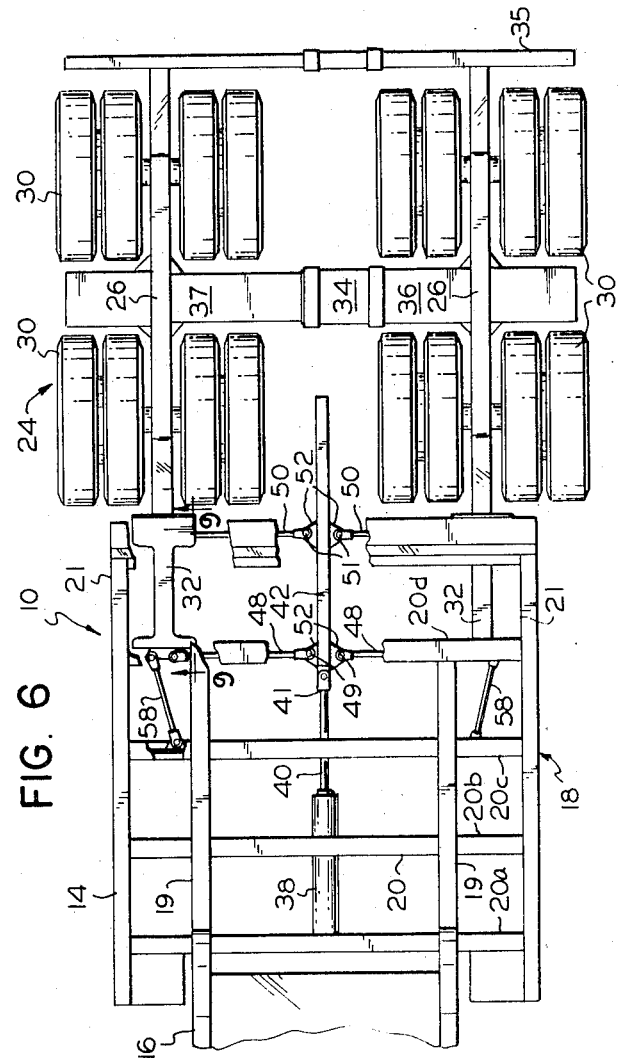

FREDERICK F. VAN RADEN
INVENTOR

BY
BUCKHORN, BLORE, KLARQUIST & SPARKMAN
ATTORNEYS

EXPANDABLE TRAILER

BACKGROUND OF THE INVENTION

This invention relates to trailers for highway trucks and, more particularly, to such a trailer capable of having its ground contacting wheels expand in the transverse direction, thereby selectively to increase the width or track of the wheels to conform to varying highway loading requirements.

State laws generally limit the loading on highway trailers as a function of the transverse width or track of their wheels. The standard width trailer is 100 inches wide, and if the load is to be increased beyond the permissible limit, a 120 inch width trailer is required. The wider trailer, however, is subject to various additional safety requirements such as forerunning and trailing vehicles to signal the fact that it is a wide load. This is an additional expense and is only warranted if the trailer has to be loaded to the higher limit during its entire time on the road.

It is thus the primary object of the present invention to provide a highway trailer the transverse width of whose wheels can be selectively varied depending on the loading to which the trailer is subjected. With heavy loads the trailer will operate in its wide track position with forerunning and trailing vehicles as required by law. When the trailer is not so loaded, however, it can operate in its narrow track position without the presence of the additional vehicles.

SUMMARY OF THE INVENTION

The trailer of the present invention achieves these and other objects and advantages by comprising a first frame which is attachable to a driving vehicle and a second frame attached to the first frame and to which the trailer wheels are journaled. The second frame in turn comprises two transversely disposed girders attached to each other telescopically in the transverse direction, such girders being transversely slidable with respect to the first frame. A plurality of ground-contacting wheels are journaled from each of the second frame girders. Piston and cylinder means are attached to the second frame and adapted transversely to expand and contract its girders with respect to the first frame. In this manner, the track of the wheels may be selectively varied in accordance with legal loading requirements.

BRIEF DESCRIPTION OF THE DRAWINGS

FIG. 1 is a side elevational view of a goosenecked dropped-center trailer incorporating the present invention and illustrated attached to a driving vehicle.

FIG. 2 is a plan view, with parts broken away, of the trailer of FIG. 1 in its narrow track configuration.

FIG. 3 is a cross-sectional view taken on line 3–3 of FIG. 2.

FIG. 4 is a cross-sectional view taken on line 4–4 of FIG. 2.

FIG. 5 is a cross-sectional view taken on line 5–5 of FIG. 2.

FIG. 6 is a plan view, with parts broken away, of the trailer of the present invention illustrated in its wide track configuration.

DESCRIPTION OF THE PREFERRED EMBODIMENT

Figure 7:
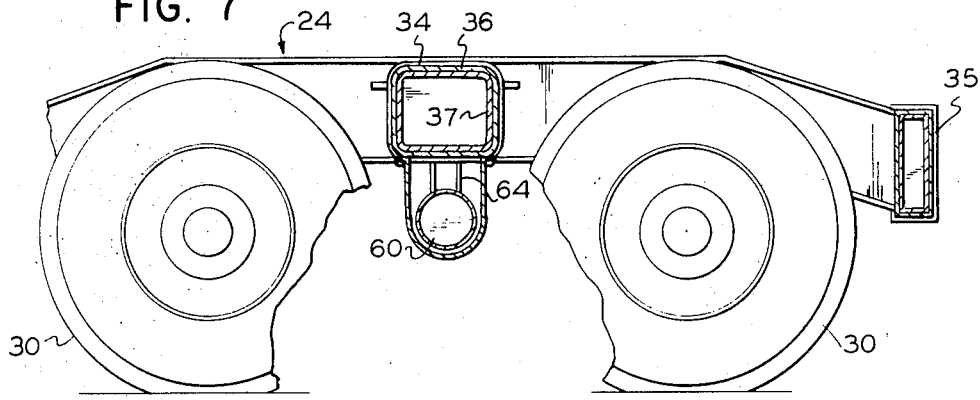
FIG. 7 is a cross-sectional view taken on line 7–7 of FIG. 2.
Figure 8:
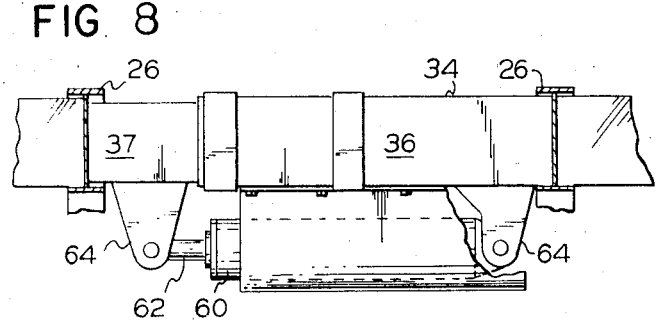
FIG. 8 is a cross-sectional view taken on line 8–8 of FIG. 2.
Figure 9:
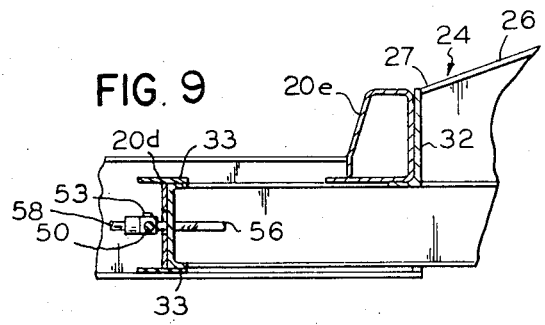
FIG. 9 is a cross-sectional view taken on line 9–9 of FIG. 6.

Referring to the drawings, FIGS. 1—9 illustrate the invention incorporated in a goosenecked dropped-center trailer 10 mounted on a driving vehicle 12. The trailer 10 includes a dropped-center platform 14 supported at its front 15 by two goosenecked girders 16 attached to the vehicle 12 through a fifth wheel 17.

The platform 14 comprises a frame 18 having two main longitudinally extending girders 19 joined by crossbeams 20 which terminate in outrigger beams 21. The girders 19 are welded to the goosenecked girders 16 and a decking 22 is bolted to the crossbeams 20 in the usual manner. Girders 19 extend rearwardly only to the next-to-last crossbeam 20d, the outrigger beams 21 being joined by the rearmost crossbeam 20e which is built in the shape of a box beam for a purpose to be hereinafter described.

A second or subframe 24 comprising two transversely disposed girders 26 is positioned rearwardly of the main frame 18. Each of the girders 26 supports a walking beam 28 from which are journaled eight wheels 30 in two groups of four each. Each girder 26 is welded at its forward end 27 to an L-shaped extension beam 32 which abuts the rearmost crossbeam 20e and nests within the flanges 33 of the adjacent crossbeam 20d of the frame 18. (See FIG. 9.) The two girders 26 are joined by two box section crossbeams 34, 35 which are adapted to telescope in the transverse direction. (See FIGS. 7 and 8.) As illustrated, beam 34 comprises two parts 36 and 37, the part 37 being adapted to slide in and out of the part 36 as required. Beam 35 is similarly constructed. By this means, the girders 26 can be moved toward and away from each other in the transverse direction of the trailer to vary the track or width of the wheels 30.

Transverse expansion of the girders 26 is effectuated by two sets of hydraulic cylinders and pistons. A first double-acting longitudinally-oriented hydraulic cylinder 38 is positioned along the centerline of the main frame 18 being supported by crossbeams 20a and 20b. (see FIG. 5.) Cylinder 38 has a piston 40 to the distal end 41 of which is attached an extension member 42, also in the form of a box beam. The extension member 42 is supported by and slides between two pairs of rollers 44, 46 mounted on a plate 47 depending from the crossbeam 20e (see FIG. 3) and between similar rollers 44' (see FIG. 5) mounted on the web of the crossbeam 20d.

Two pairs of arms 48, 50 are pivotally attached at their inner ends 49, 51 to brackets 52 attached to the sides of the extension member 42. (See FIG. 4.) The arms 48, 50 pass through openings 55 in the webs of the girders 19 and are pivotally attached at their outer ends 53, 54 to brackets 56 passing through openings in the in the web of the crossbeam 20d and attached to the extension beams 32 of the girders 26. The extension beams 32 are further pivotally attached to the crossbeams 20c by additional arms 58. It is thus seen that the attachment of the second frame girders 26 to the first or main frame 18 is by means of the arms 48, 50 and 58 which are attached to the extensions 32.

A second double-acting transversely-oriented hydraulic cylinder 60 having a piston 62 is attached to brackets 64 mounted underneath and attached to the parts 36 and 37 of the box beam 34. (see FIG. 8.) Extension of the piston 62 in cooperation with the cylinder 38 extends the beams 34 and 35, thereby to increase the spacing between the girders 26.

The operation of the expandable trailer is as follows. When the trailer 10 is in its narrow track configuration (as illustrated in FIGS. 2 and 5) the piston 40 is retracted within the cylinder 38 and the girders 26 are close together such that the distance between the outboard wheels 30 is the standard 100 inches. If the transverse distance between the wheels is to be increased so that the trailer achieves its wide track configuration, the vehicle 12 is started so that the trailer 10 is in motion behind it. Hydraulic fluid is then pumped into the cylinders 38 and 60 to extend the pistons 40 and 62, respectively.

As the piston 40 is extended from the cylinder 38, the extension member 42 is pushed rearwardly between the rollers 44 and 46 causing the arms 48 and 50 to thrust the extension beams 32 transversely outwardly. Presence of the arms 58 requires the extension beams 32 also to move longitudinally slightly rearwardly during this transverse motion, thereby to decrease the pressure they exert against the crossbeams 20d and 20e during the movement. Extension of the piston 62 from the cylinder 60 also aids by expanding the beams 34 and 35. The fact that the assemblage is undergoing motion and the wheels 30 are actually rolling in contact with the ground facilitates their transverse expansion. The final wide-track configuration is illustrated in FIG. 6, the outwardly swung arms 58 having drawn the extension beams 32 back snugly into contact with the crossbeam 20d and the box beam 20e.

When the trailer is to be reduced to its narrow configuration, the process is merely reversed.

I claim:

1. A transversely expandable trailer for highway trucks comprising:
   a first frame attachable to a driving vehicle;
   a second frame attached to said first frame, said second frame comprising two transversely disposed girders having a plurality of ground-contacting wheels journaled therefrom, said girders being attached to each other telescopically in the transverse direction, said girders being transversely slidable with respect to said first frame;
   an extension beam attached to each of said second frame girders;
   a longitudinally-oriented hydraulic cylinder attached to said first frame along the centerline thereof;
   a piston received within said cylinder;
   a first set of arms attached to said piston at their inner ends, said arms being attached at their outer ends to said extension beams of said second frame girders; and
   a second set of arms pivotally attached to said extension beams and to said first frame, said first and second sets of arms cooperating to cause said second frame girders to move slightly longitudinally while being urged transversely apart upon extension of said piston from said longitudinally-oriented cylinder.

2. The trailer of claim 1 further comprising a telescoping crossbeam attached to and joining said second frame girders.

3. The trailer of claim 2 further comprising:
   a transversely-oriented hydraulic cylinder attached to one part of said telescoping crossbeam; and
   a piston received in said transversely-oriented cylinder and attached to the other part of said telescoping crossbeam, extension of said piston from said tr transversely-oriented cylinder expanding said crossbeam and assisting said longitudinally-oriented cylinder to vary the transverse spacing of said second frame girders.